(12) United States Patent
Wolf et al.

(10) Patent No.: US 8,672,305 B2
(45) Date of Patent: Mar. 18, 2014

(54) WORK APPARATUS

(75) Inventors: Günter Wolf, Oppenweiler (DE); Johannes Menzel, Wernau (DE); Ralf Steidinger, Stuttgart (DE); Andreas Guip, Waiblingen (DE); Maximilian Eberhardt, Esslingen (DE)

(73) Assignee: Andrea Stihl AG & Co. AG, Waiblingen (DE)

( * ) Notice: Subject to any disclaimer, the term of this patent is extended or adjusted under 35 U.S.C. 154(b) by 475 days.

(21) Appl. No.: 12/923,493

(22) Filed: Sep. 24, 2010

(65) Prior Publication Data

US 2011/0079943 A1 Apr. 7, 2011

(30) Foreign Application Priority Data

Oct. 5, 2009 (DE) .................... 10 2009 048 322

(51) Int. Cl.
*F16F 7/00* (2006.01)

(52) U.S. Cl.
USPC .......... 267/141.2; 267/137; 267/141; 30/381; 173/162.2

(58) Field of Classification Search
USPC ........... 267/137, 141, 141.2, 141.3, 153, 292; 248/638; 30/381; 173/162.2
See application file for complete search history.

(56) References Cited

U.S. PATENT DOCUMENTS

| | | | |
|---|---|---|---|
| 3,637,029 A * | 1/1972 | Sherwood et al. | 173/162.2 |
| 3,652,074 A * | 3/1972 | Frederickson et al. | 267/137 |
| 3,728,793 A * | 4/1973 | Makinson et al. | 30/383 |
| 3,813,776 A * | 6/1974 | Frederickson et al. | 30/381 |
| 3,845,557 A | 11/1974 | Bailey | |
| 3,972,119 A * | 8/1976 | Bailey | 30/381 |
| 4,135,301 A | 1/1979 | Hoeppner | |
| 4,202,096 A * | 5/1980 | Nagashima | 30/381 |
| 4,530,491 A * | 7/1985 | Bucksbee et al. | 267/141 |
| 4,756,516 A * | 7/1988 | Tondato | 267/153 |
| 4,785,539 A * | 11/1988 | Nagashima | 30/381 |
| 4,896,426 A * | 1/1990 | Nagashima | 30/383 |
| 5,103,529 A | 4/1992 | Koenig | |
| 5,699,865 A * | 12/1997 | Forderer et al. | 173/162.2 |
| 6,394,434 B2 * | 5/2002 | Wolf et al. | 267/141 |
| 7,219,433 B2 * | 5/2007 | Gorenflo et al. | 30/383 |
| 7,669,677 B2 * | 3/2010 | Ko | 180/68.4 |

FOREIGN PATENT DOCUMENTS

| | | |
|---|---|---|
| DE | G 89 13 638.1 U1 | 1/1990 |
| DE | 1 20 2005 006 350 U1 | 6/2005 |
| GB | 1 307 509 | 2/1973 |
| JP | 61218844 A * | 9/1986 .................... 267/153 |

* cited by examiner

*Primary Examiner* — Thomas J Williams
*Assistant Examiner* — Mariano Sy
(74) *Attorney, Agent, or Firm* — Walter Ottesen P.A.

(57) ABSTRACT

A work apparatus has at least one handle (12) and a drive motor (3). The handle (12) is connected to said drive motor (3) via at least one anti-vibration element (16, 17, 18, 19, 20). The anti-vibration element (18, 19) is held on a first housing part and coacts with a second housing part. To achieve good damping, the anti-vibration element (19) includes a damping section (25) having an annularly-shaped wall (37) which expands in the direction of the second housing part.

18 Claims, 3 Drawing Sheets

WORK APPARATUS

CROSS REFERENCE TO RELATED APPLICATION

This application claims priority of German patent application no. 10 2009 048 322.5, filed Oct. 5, 2009, the entire content of which is incorporated herein by reference.

FIELD OF THE INVENTION

The invention relates to a work apparatus such as a chain saw, a cut-off machine or the like.

BACKGROUND OF THE INVENTION

In a work apparatus with at least one handle, which is commonly guided by hand during operation, it is known to provide anti-vibration elements between the drive motor and the handle to dampen vibrations occurring during operation.

DE 20 2005 006 350 U1 discloses an earth compactor which has a stop buffer. The stop buffer is cylindrical and has a chamfer on its impact surface.

It has been shown that in such stop buffers, especially in work apparatus, in which the wall thickness of the stop buffer must be comparatively slight, the wall can buckle. Accordingly, only an insufficient damping effect is achieved.

SUMMARY OF THE INVENTION

An object of the invention is to provide a work apparatus of the kind in which a good damping of the vibrations occurring during operation can be achieved.

The work apparatus of the invention includes: a first housing part; a second housing part; at least one anti-vibration element held on the first housing part and configured to coact with the second housing part during operation of the work apparatus; and, the anti-vibration element having a damping section which has an annularly-shaped wall expanding in a direction toward the second housing part.

The damping section, which expands outwardly in an annular-like manner, prevents a lateral buckling of the anti-vibration element. The damping section as a general rule contributes to the damping effect over its entire area, resulting in good damping characteristics. The annularly-shaped, outwardly expanding configuration results in a progressive damping characteristic which is desirable for work apparatus. The annularly-shaped wall can thereby expand linearly or in the form of an arc. The wall thereby advantageously expands continuously, thus without steps or erratic diameter changes.

Advantageously, the wall thickness and the extent to which the damping section is open are matched to each other so that when a constructively predetermined force exerted during operation is exceeded, the damping section bends outwardly so that the second housing part contacts the inner side of the wall of the damping section. With larger forces, an increased stability of the anti-vibration element is achieved because of the contact engagement on the inner side of the wall of the damping section.

Advantageously, the outer diameter of the damping section at the end facing the first housing part is about 70% up to about 90% of the outer diameter of the end facing the second housing part. A ratio of the outer diameters of about 80% has been shown to be especially advantageous. The height of the damping section is advantageously between about 20% and about 80% of the end of the outer diameter facing the second housing part. The height of the damping section is thereby less than the largest outer diameter of the damping section. This results in good damping characteristics and a high stability of the damping section. Advantageously, the height of the damping section is between about 30% and 60% of the largest outer diameter. A height of the damping section between about 35% and 45% of the largest outer diameter has been shown to be especially advantageous. The wall thickness of the damping section is advantageously between about 10% and about 30% of the outer diameter of the end facing the second housing part. This comparatively thin configuration of the damping section allows an outward bending away. At the same time a sufficiently high stability and a good damping effect are achieved.

Advantageously, the anti-vibration element contacts the second housing part when the work apparatus is in an unloaded state. When in the unloaded state, the anti-vibration element acts between the two housing parts. When the two housing parts are pulled apart, a distance results and the anti-vibration element is no longer in contact engagement with the second housing part and does not contribute to the damping effect. The anti-vibration element thereby functions as a stop buffer. An advantageous damping characteristic is achieved when the anti-vibration element has a stop which, in the unloaded state of the work apparatus, is at a distance to the second housing part. In case of very small oscillations, the anti-vibration element abuts on the second housing part resulting in a comparatively soft damping. As soon as the gap between the stop and the housing part is overcome, the stop also abuts on the second housing part. From this point onwards, a comparatively large damping occurs. Accordingly, a progressive damping characteristic can be easily achieved. If the housing parts are not moved toward each other but pulled apart, then the anti-vibration element lifts off the second housing part and no longer contributes to the damping effect between the two housing parts.

An advantageous arrangement results when the stop is arranged inside the annularly-shaped damping section. Thus, a small, compact manufactured size is achieved. Expediently, the anti-vibration element has a base body onto which the damping section is formed. The stop is advantageously on a protruding section of the base body. The anti-vibration element has an assembly opening to facilitate the mounting of the anti-vibration element. The anti-vibration element can, for example, be accommodated on the assembly opening with a screw driver and then be mounted on the first housing part. The assembly opening is conveniently arranged in the area of the stop. The assembly opening can, in particular, be surrounded by the stop.

It has been shown that the damping section can attach itself to the second housing part like a suction cup when the second housing part has a smooth wall. The damping effect can thereby be affected. To avoid an attaching of the damping section because of suction, the damping section has at least one raised portion on an edge thereof facing toward the second housing part which raised portion is configured to contact engage the second housing part. As a result of the raised portion, the generation of a vacuum between the damping section and the second housing part is avoided. Expediently, the raised portion also extends on the inner side of the wall of the damping section, so that an attachment on the second housing part is avoided even if the damping section bends outwardly. This is easily achieved when three raised portions are distributed and arranged along the periphery.

Advantageously, the anti-vibration element is configured integrally and is made of elastic material. To enable a simple mounting of the anti-vibration element on the first housing part, the anti-vibration element has a connecting part on the end lying opposite the damping section with which the anti-vibration element is fixed into an opening of the first housing part. Thereby, no additional means are necessary for fastening the anti-vibration element.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
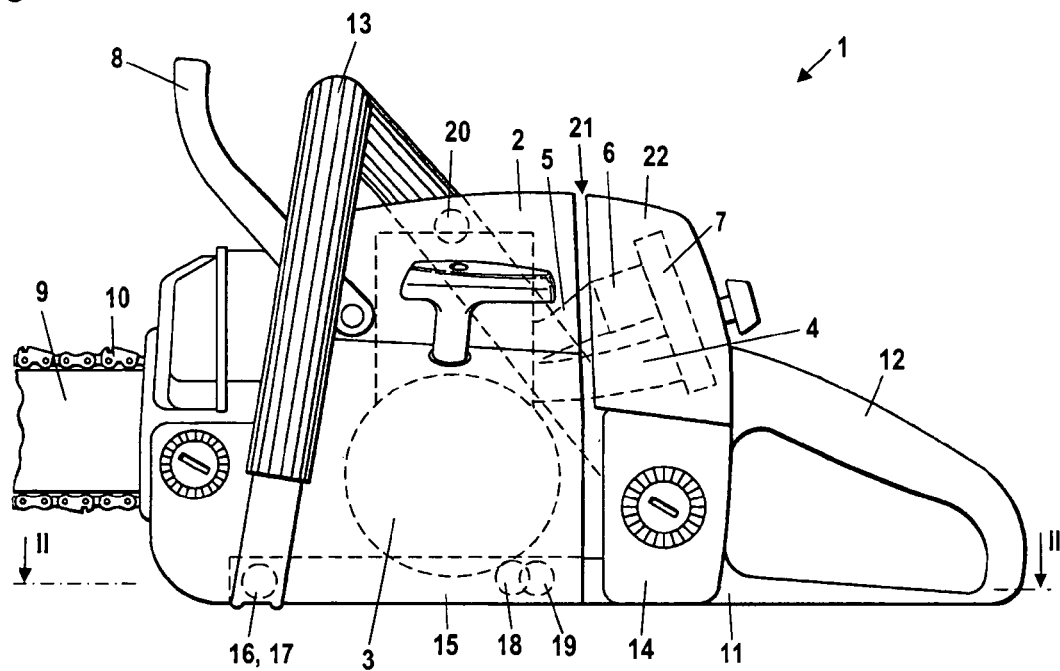
FIG. 1 is a schematic view of a chain saw.

FIG. 1 shows a handheld chain saw 1 as an embodiment for a work apparatus. The work apparatus can, however, also be a cut-off machine or a similar handheld work apparatus. The chain saw 1 has a motor housing 2, in which a drive motor 3 is arranged. The drive motor 3 is configured as a two-stroke engine operating with a scavenging advance air and has an air channel 4 for the supply of largely fuel-free combustion air as well as a mixture channel 5 which is supplied with fuel/air mixture via a carburetor 6. The mixture channel 5 and the air channel 4 are connected to an air filter 7 arranged in an air filter case 22. A guide bar 9, in which a saw chain 10 is revolvingly guided, is fixed on the motor housing 2. The saw chain 10 is driven by the drive motor 3. A hand guard 8, which triggers a chain brake (not shown), is pivotally mounted on the motor housing 2.

The chain saw 1 has a rear handle 12 and a handle bar 13 for guiding. The rear handle 12 and the handle bar 13 are part of handle housing 11 which also includes a fuel tank 14 and a bracket 15. The bracket 15 extends in the lateral direction of the chain saw 1 on the under side of the motor housing 2 and is overlapped by the motor housing 2.

During operation, vibrations are generated by the drive motor 3 and the driven saw chain 10. These vibrations should not be or only minimally be transferred to the handle housing 11. For this purpose, anti-vibration elements 16, 17, 18, 19, and 20 are arranged between the handle housing 11 and the motor housing 2. To allow for movement of the motor housing 2 relative to the handle housing 11, a vibration gap 21 is formed between the motor housing 2 and the handle housing 11. As FIG. 1 shows, the air filter case is also connected to the handle housing 11, so that the mixture channel 5 and the air channel 4 must bridge the vibration gap 21.

Figure 2:
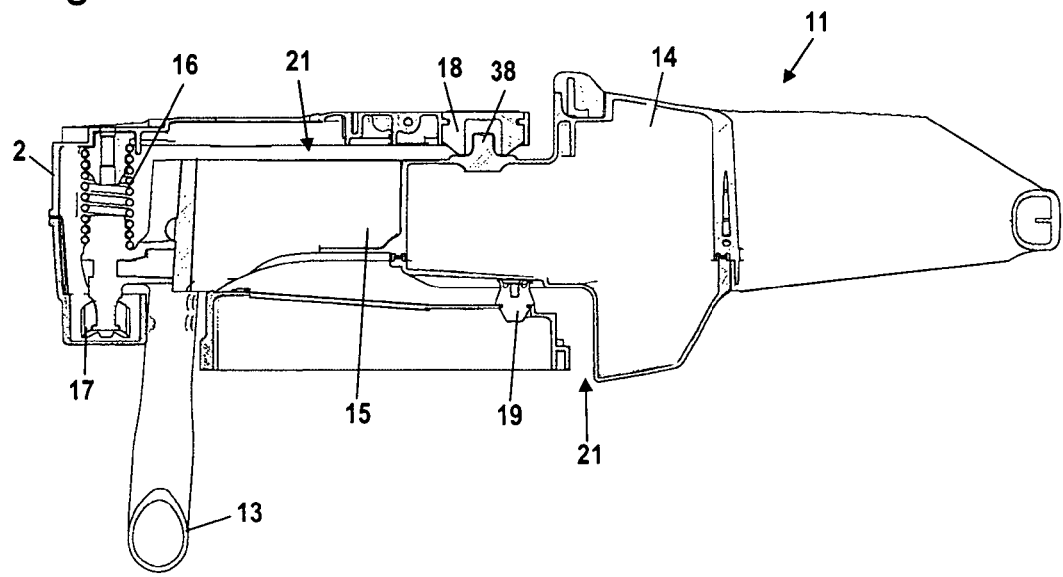
FIG. 2 is a section view through a chain saw along line II-II in FIG. 1.

FIG. 2 shows the arrangement of the anti-vibration elements 16, 17, 18, and 19. The anti-vibration elements 16 and 17 are arranged at the front end of the bracket 15. The anti-vibration element 16 is configured as a coil-spring anti-vibration element and the anti-vibration element 17 is made of elastic material, for example, a foamed plastic. The anti-vibration element 18 is held in a receptacle of the motor housing 2 and coacts with a connecting part 38 which functions as a stop in the radial direction. The anti-vibration element 18 is arranged next to the fuel tank and on the side of the chain saw 1 on which the guide bar 9 projects forward. The anti-vibration element 19, whose configuration is further described below, is provided on the opposite side of the bracket 15.

Figure 3:
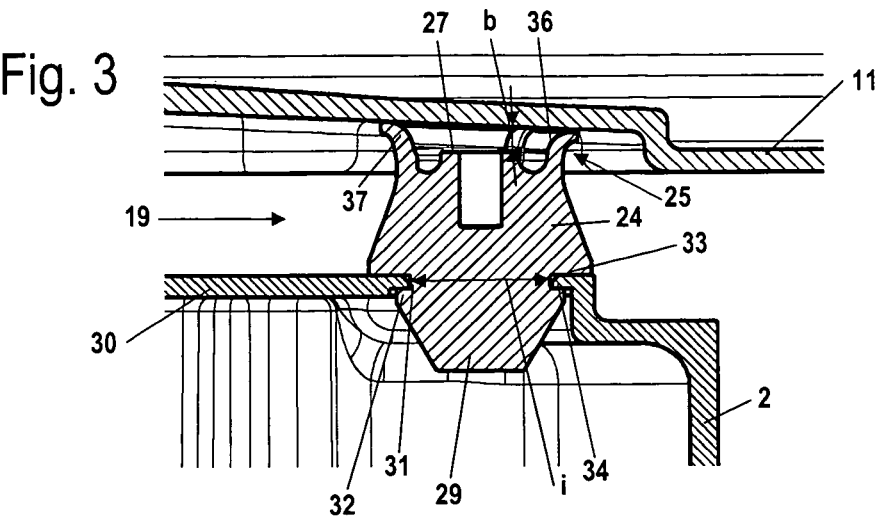
FIG. 3 is a view of a detail of the section view of FIG. 2 in a different position of the housing parts.

As FIG. 3 shows, the anti-vibration element 19 is held on the motor housing 2. For this purpose, the motor housing 2 has an opening 31 in which a connecting part 29 of the anti-vibration element 19 is fixed. The connecting part 29 thereby projects into the interior of the motor housing 2. The anti-vibration element 19 has a base body 24 on which the connecting part 29 is formed. A slot 32 is formed between the base body 24 and the connecting part 29. The housing wall 30 of the motor housing 2, in which the opening 31 is formed, engages into the slot 32. As FIG. 3 shows, the anti-vibration element has a contact surface 33 on the base body 24, which rests on the outside of the housing wall 30, and a contact surface 34 on the connecting part 29 which rests against the inner side of the housing wall 30. The contact surface 33 is thereby formed larger than contact surface 34, since primarily pressure forces from the handle housing 11 are applied to the anti-vibration element 19.

A damping section 25 is formed on the end of the base body 24 facing the handle housing 11. The damping section 25 has a wall 37 which is configured circumferentially and annularly-shaped and continuously expands in the direction of the handle housing 11. The damping section 25 can thereby be approximately conical and essentially hollow. The anti-vibration element 19 is, with the exception of the raised part described more closely below, rotationally symmetrical to a longitudinal central axis 23. The distance from the wall 37 to the longitudinal central axis 23 continuously increases with increasing distance from the motor housing 2 in the damping section 25. The wall 37 can thereby extend straight or curved in the longitudinal direction.

A stop 27, which is formed on the base body 24, projects into the damping section 25. The base body 24 has an assembly opening 28 which opens at about the middle of the stop 27 and projects into the interior of the base body 24. The assembly opening 28 can have, as in the embodiment, a circular cross-section; however, other forms which depart from the circular can also be advantageous for the assembly opening 28. A tool, for example a screw driver, with which the anti-vibration element can be gripped for mounting in the opening 31, can be inserted at the assembly opening 28.

FIG. 3 shows the anti-vibration element 19 in unloaded state. The damping section 25 rests on the handle housing 11. The stop 27 is still distanced from the handle housing 11 in this position and is at a distance (b) to the handle housing 11. In the position shown in FIG. 3, the vibration damping occurs via the damping section 25. As FIG. 3 shows, the damping section 25 has an inner side 36 which lies against the handle housing 11 when subject to load.

Figure 4:
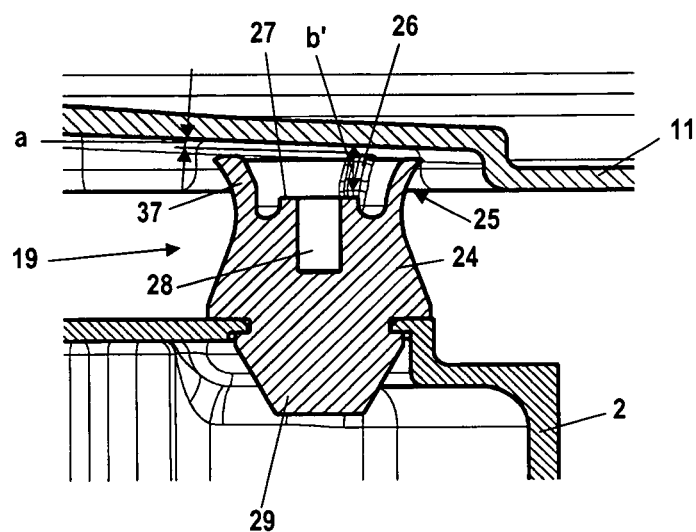
FIG. 4 is a view of the detail of the section view of FIG. 2 in a different position of the housing parts.

FIG. 4 shows the anti-vibration element 19 in a state wherein the motor housing 2 and the handle housing 11 are pulled apart. In this state, the anti-vibration element 19 is at a distance (a) to the handle housing 11. The distance (b) has increased to a distance (b') in relation to the unloaded state. The distances (b) and (b') are considerably larger than the distance (a). The distances (b, b') are a multiple of distance (a). In this state of the chain saw 1, the anti-vibration element 19 does not provide a functional connection between the motor housing 2 and the handle housing 11 because of distance (a). In the position shown in FIG. 4, the handle housing 11 and the motor housing 2 have moved away from each other compared to the unloaded state and in particular by somewhat more than the distance (a).

Figure 5:
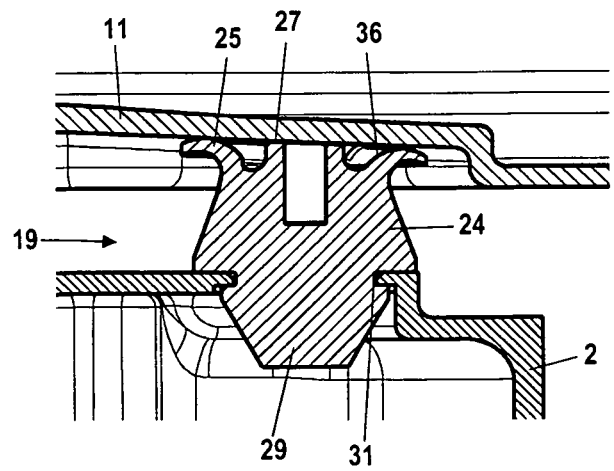
FIG. 5 is a view of the detail of the section view of FIG. 2 in a different position of the housing parts.

FIG. 5 shows the anti-vibration element 19 in a loaded state. The handle housing 11 and the motor housing 2 are moved toward each other compared to the unloaded state. The stop 27 rests on the handle housing 11 in the position shown in FIG. 5. The damping section 25 has been bent outwardly, so that the inner side 36 of the damping section 25 rests against the handle housing 11. In this state, the damping occurs via the base body 24 which is configured substantially solidly and also has a conical form which expands in the direction toward the motor housing 2. The forces to be transferred to the handle housing 11 are transferred via the stop 27 and the damping section 25 which rests substantially flatly on the handle housing 11. Thereby, a clearly stepped, progressive damping characteristic is achieved depending on whether the stop 27 already rests on the handle housing 11 or is still at a distance therefrom.

Figure 6:
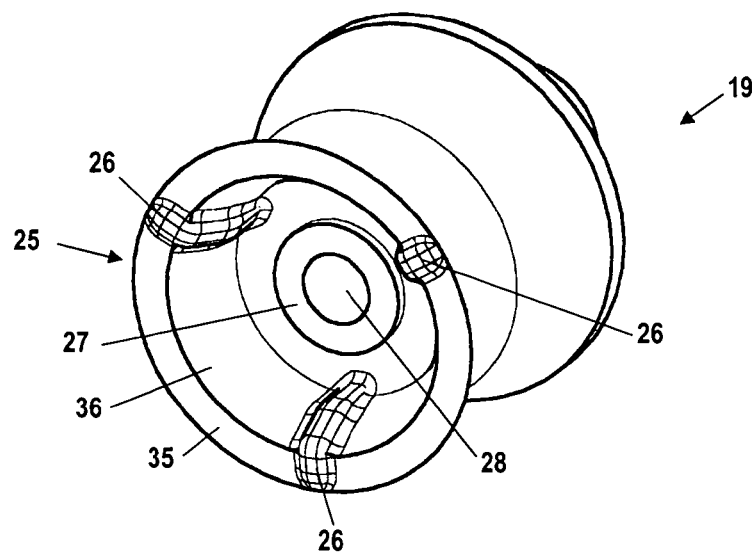
FIG. 6 is a perspective view of the anti-vibration element.
Figure 7:
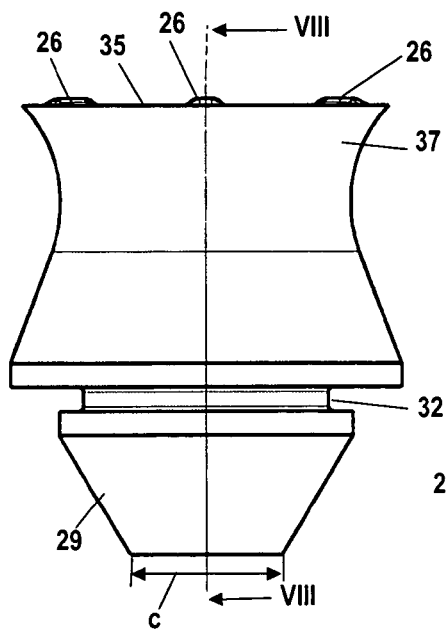
FIG. 7 is a side view of the anti-vibration element.
Figure 8:
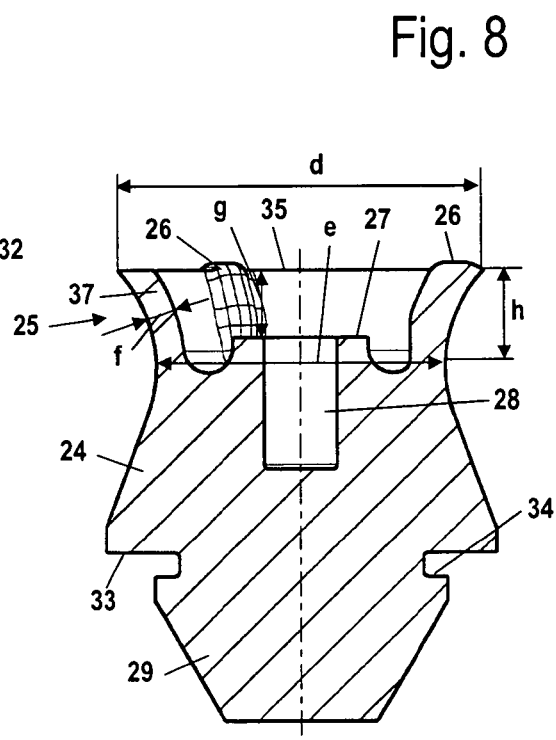
FIG. 8 is a section view along the line VIII-VIII in FIG. 7.

FIGS. 6 to 8 show the configuration of the anti-vibration element 19 in detail. On the end facing the handle housing 11, the damping section 25 has an evenly formed edge 35 on which three raised parts 26 are provided. The raised parts 26 extend on the edge 35 as well as over the entire inner side 36 of the damping section 25. The raised parts 26 prevent the damping section from becoming attached to the handle housing 11 like a suction cup. As FIG. 7 shows, the connecting part 29 has a diameter (c) on the end facing away from the slot 32 which is smaller than the diameter (i) of the opening 31 in the housing wall 30 shown in FIG. 4. In this way, the connecting part 29 can easily be mounted in the opening 31.

The dimensions of the anti-vibration element 19 are shown in detail in FIG. 8. The damping section 25 has an outer diameter (d) in the area of the edge 35 which is greater than an outer diameter (e) on the end of the damping section which faces the base body 24. The outer diameter (e) is advantageously between about 70% and about 90% as large as the outer diameter (d). A size between about 75% and about 85% has been shown to be especially advantageous. The damping section 25 has a height (h) which is clearly less than the outer diameters (d) and (e). The height (h) is advantageously between about 20% and about 80% of the outer diameter (d) in the area of the edge 35. Advantageously, the height (h) is between about 30% and about 60%, in particular between about 35% and about 50% of the outer diameter (d). The damping section 25 is thus comparatively short and wide. The wall 37 in the damping section 25 has a wall thickness (f) which is advantageously between about 10% and about 30% of the outer diameter (d). A ratio between the wall thickness (f) to the outer diameter (d) between about 15% and about 30% has been shown to be especially advantageous. The wall thickness (f) is, in this instance, measured at a flat area of the wall 37 and not at a raised part 26. As FIG. 8 also shows, the stop 27 is in an area which is surrounded by damping section 25 at a distance (g) below the edge 35 of the damping section 25. The distance (g) is thereby somewhat smaller than the height (h) of the damping section 25, so that the stop 27 projects into the damping section 25.

It is understood that the foregoing description is that of the preferred embodiments of the invention and that various changes and modifications may be made thereto without departing from the spirit and scope of the invention as defined in the appended claims.

What is claimed is:

1. A work apparatus comprising:
   a first housing part;
   a second housing part;
   at least one anti-vibration element held only on said first housing part and configured to coact with said second housing part during operation of said work apparatus;
   said anti-vibration element having a damping section having a first end facing toward said first housing part and a second end facing toward said second housing part;
   said damping section having an annularly-shaped wall expanding in a direction toward said second housing part;
   said damping section having a first diameter (e) at said first end thereof and a second diameter (d) at said second end thereof; and,
   said first diameter (e) being smaller than said second diameter (d).

2. The work apparatus of claim 1, further comprising
   a handle associated with one of said parts and a drive motor associated with the other one of said parts so as to cause said drive motor to be connected to said handle via said anti-vibration element.

3. The work apparatus of claim 2, wherein said damping section has a degree of opening and said annularly-shaped wall of said damping section has a wall thickness (f) and an inner side; and, said wall thickness (f) and said degree of opening are matched to each other so as to cause said damping section to bend outwardly with said second housing part lying in contact engagement with said inner side when a constructively predetermined force applied during operation of said work apparatus is exceeded.

4. The work apparatus of claim 1, wherein said damping section has a first end facing said first housing part and a second end facing said second housing part; said first end has an outer diameter (e) and said second end has a diameter (d); and, said outer diameter (e) of said first end lies in the range of about 70% to about 90% of said diameter (d) of said second end.

5. The work apparatus of claim 1, wherein said damping section has an end of outer diameter (d) facing said second housing part and a height (h); and, said height (h) lies in a range of about 20% to about 80% of said outer diameter (d).

6. The work apparatus of claim 1, wherein said damping section has an end of outer diameter (d) facing said second housing part; and, said annularly-shaped wall of said damping section has a wall thickness (f) lying in a range of about 10% to about 30% of said outer diameter (d).

7. The work apparatus of claim 1, wherein said anti-vibration element is configured to rest on said second housing part when said work apparatus is in an unloaded state.

8. The work apparatus of claim 1, wherein said anti-vibration element has a stop configured to be at a distance (b) to said second housing part when said work apparatus is in an unloaded state.

9. The work apparatus of claim 8, wherein said stop is arranged in said damping section.

10. The work apparatus of claim 8, wherein said anti-vibration element has a base body on which said damping section is formed.

11. The work apparatus of claim 10, wherein said base body has a protrusion and said stop is configured on said protrusion.

12. The work apparatus of claim 8, wherein said anti-vibration element has an assembly opening.

13. The work apparatus of claim 12, wherein said assembly opening is arranged in the region of said stop.

14. The work apparatus of claim 1, wherein said damping section has an edge facing toward said second housing part; and, said edge has at least one raised portion configured to come into contact engagement with said second housing part.

15. The work apparatus of claim 14, wherein said wall of said damping section has an inner side; and, said raised portions extend along said inner side of said wall.

16. The work apparatus of claim 1, wherein said damping section has an edge facing toward said second housing part; and, said edge has three raised portions evenly distributed over the periphery of said edge.

17. The work apparatus of claim 1, wherein said anti-vibration element is configured as a single part made of elastic material.

18. The work apparatus of claim 1, wherein said first housing part has an opening; said anti-vibration element has an end lying opposite said damping section; and, said anti-vibration element has a connecting part on said end thereof configured to attach said anti-vibration element into said opening of said first housing part.

\* \* \* \* \*

UNITED STATES PATENT AND TRADEMARK OFFICE
CERTIFICATE OF CORRECTION

PATENT NO.         : 8,672,305 B2                                    Page 1 of 1
APPLICATION NO.    : 12/923493
DATED              : March 18, 2014
INVENTOR(S)        : G. Wolf et al.

It is certified that error appears in the above-identified patent and that said Letters Patent is hereby corrected as shown below:

On Title Page:
Under (73) Assignee: delete "Andrea" and insert -- Andreas -- therefor.
Under (73) Assignee: delete "Co. AG" and insert -- Co. KG -- therefor.

Signed and Sealed this
Twenty-fourth Day of June, 2014

Michelle K. Lee
*Deputy Director of the United States Patent and Trademark Office*